US009613324B2

(12) United States Patent
Bartsch et al.

(10) Patent No.: US 9,613,324 B2
(45) Date of Patent: Apr. 4, 2017

(54) APPARATUS AND METHODS FOR DECOMPOSING SERVICE PROCESSES AND FOR IDENTIFYING ALTERNATE SERVICE ELEMENTS IN SERVICE PROVIDER ENVIRONMENTS

(75) Inventors: Christian Bartsch, Pforzheim (DE); Genady Y. Grabarnik, Scarsdale, NY (US); Larisa Shwartz, Scarsdale, NY (US); Christopher Ward, Glen Ridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 1120 days.

(21) Appl. No.: 12/058,051

(22) Filed: Mar. 28, 2008

(65) Prior Publication Data
US 2009/0248461 A1 Oct. 1, 2009

(51) Int. Cl.
G06Q 10/06 (2012.01)
H04L 12/24 (2006.01)

(52) U.S. Cl.
CPC ......... *G06Q 10/06* (2013.01); *G06Q 10/0633* (2013.01); *G06Q 10/06312* (2013.01); *H04L 41/5009* (2013.01)

(58) Field of Classification Search
CPC ............. G06Q 10/063; G06Q 10/6312; G06Q 10/6315; H04L 41/5009; Y02B 60/142
See application file for complete search history.

(56) References Cited

U.S. PATENT DOCUMENTS

| 5,495,479 | A | 2/1996 | Galaand et al. ................. 370/60 |
| 5,963,447 | A | 10/1999 | Kohn et al. ............... 364/148.04 |
| 6,108,700 | A | 8/2000 | Maccabee et al. ........... 709/224 |
| 6,154,766 | A * | 11/2000 | Yost et al. ..................... 709/201 |
| 6,327,551 | B1 | 12/2001 | Peterson et al. ................... 703/1 |
| 6,363,477 | B1 * | 3/2002 | Fletcher et al. .............. 713/151 |
| 6,370,681 | B1 * | 4/2002 | Dellarocas et al. .......... 717/110 |
| 6,640,231 | B1 | 10/2003 | Andersen et al. ............ 707/102 |
| 6,901,440 | B1 | 5/2005 | Bimm et al. .................. 709/223 |
| 7,200,563 | B1 | 4/2007 | Hammitt et al. ................. 705/7 |

(Continued)

OTHER PUBLICATIONS

ISO/IEC, 20000-1: Information technology—Service management—Part 1: Specification, 2005, p. 12.

(Continued)

*Primary Examiner* — Matthew Gart
*Assistant Examiner* — Stephen S Swartz
(74) *Attorney, Agent, or Firm* — Harrington & Smith; Louis J. Percello (57) ABSTRACT

Methods, apparatus and computer program products decompose a service process into service process operations; filter the service operations based on at least one pre-determined criterion; identify at least one different service process operation to be used to replace an existing service process operation; and replace the existing service process operation with the at least one different service process operation. The service process can be decomposed using specific service features derived from reference service processes. The pre-determined criterion used to filter the service operations can constitute a service level; a service category; or a service process feature. A service process feature describes core functionality of the service.

20 Claims, 9 Drawing Sheets

(56) References Cited

U.S. PATENT DOCUMENTS

| | | | |
|---|---|---|---|
| 7,716,077 B1* | 5/2010 | Mikurak | G06Q 10/0631 705/7.12 |
| 7,962,582 B2* | 6/2011 | Potti et al. | 709/220 |
| 7,979,840 B2* | 7/2011 | Zhang et al. | 717/104 |
| 8,250,521 B2* | 8/2012 | Zhang et al. | 717/104 |
| 2002/0078046 A1* | 6/2002 | Uluakar | G06F 8/20 |
| 2003/0004908 A1* | 1/2003 | Linthicum | G06F 17/50 706/45 |
| 2003/0033184 A1* | 2/2003 | Benbassat | G06Q 10/06 705/7.14 |
| 2003/0097195 A1* | 5/2003 | Yamrom | G06T 19/20 700/95 |
| 2003/0208456 A1* | 11/2003 | Greenstein | 707/1 |
| 2004/0054780 A1* | 3/2004 | Romero | 709/226 |
| 2004/0259534 A1* | 12/2004 | Chaudhari | G06Q 20/102 455/414.1 |
| 2005/0021355 A1* | 1/2005 | Brendle et al. | 705/1 |
| 2005/0027495 A1 | 2/2005 | Matichuk | 703/2 |
| 2006/0089943 A1* | 4/2006 | Creel et al. | 707/102 |
| 2006/0101057 A1* | 5/2006 | Farkkila | 707/102 |
| 2006/0248165 A1* | 11/2006 | Sridhar et al. | 709/218 |
| 2007/0245297 A1* | 10/2007 | Kuester | G06F 8/10 717/104 |
| 2008/0140759 A1* | 6/2008 | Conner et al. | 709/201 |
| 2008/0270973 A1* | 10/2008 | Edwards et al. | 717/104 |
| 2009/0055353 A1* | 2/2009 | Meema | 707/3 |
| 2009/0177775 A1* | 7/2009 | Radia et al. | 709/226 |
| 2011/0004564 A1* | 1/2011 | Rolia et al. | 705/348 |
| 2011/0004565 A1* | 1/2011 | Stephenson et al. | 705/348 |

OTHER PUBLICATIONS

C. Golbreich, "Combining Rule and Ontology Reasoners for Semantic Web", in Rules and Rule Markup Languages for the Semantic. Web, LNCS vol. 3323/2004, Springer-Verlag, Berlin Heidelberg, 2004, pp. 6-22.

J. Davies, R. Studer and P. Warren, Semantic Web Technologies: Trends and Research in Ontology-based Systems, Wiley, 2006.

D. Gasevic, D. Djuric, V. Devedzic, Model Driven Architecture and Ontology Development, 1$^{st}$ ed., Springer, 2006.

F. Lautenbacher and B. Bauer, "A Survey on Workflow Annotation & Composition Approaches," in Proceedings of the Workshop on Semantic Business Process and Product Lifecycle Management (SBPM 2007) in conjunction with the 3$^{rd}$ European Semantic Web Conference (ESWC 2007), vol. 251, M. Hepp, K. Hinkelmann, D. Karagiannis, R. Klein, N. Stojanovic, Eds.: CEU Workshop Proceeings, 2007, pp. 12-23.

J. Rao and X. Su, "A Survey of Automated Web Service Composition Methods," in Semantic Web Services and Web Process Composition, Lecture Notes in Comuter Science, vol. 3387, Springer-Verlag, Berlin Heidelberg, 2005, pp. 43-54.

S. Dustdar and W. Schreiner, "A Survey on web service composition," in International Journal of Web and Grid Services, vol. 1, Issue 1, D, Taniar, Eds.: Inderscience Enterprises Ltd., 2005, pp. 1-30.

N. Milanovic and M. Malek, "Current solutions for Web service composition," in IEEE Internet Computing, vol. 8(6), 2004, pp. 51-59.

F. N. Noy and D. L. McGuinness, "Ontology Development 101: A guide to creating your first ontology," Technical Report KSL-01-05, Knowledge Systems Laboratory, Stanford, 2001.

T. R. Gruber, "A Translation Approach to Portable Ontology Specifications," in Knowledge Acquisition, vol. 5(2), 1993, pp. 199-220.

J. Mei and E. Paslaru Bontas, "Reasoning Paradigms for SWRL-enabled Ontologies," Technical Report TR-B-05-01, Free University of Berlin, 2005.

B. Motik, U. Sattler and R. Studer, "Query Answering for OWL-DL with Rules" in Proceedings of the 3$^{rd}$ International Semantic Web Conference (ISWC 2004), Hiroshima, Japan 2004, pp. 549-563.

L. Kuang, S. Deng, Y. Li, W. Shi, Z. Wu, "Exploring Semantic Technologies in Service Matchmakin," in Proceedings of the Third European Conference on Web Services (ECOWS'05), IEEE Computer Society, Washington, 2005, pp. 226-234.

W. Zhu, Z. Du, S. Zhu, "Dynamic Service Composition Based on Peer-to-Peer Network," in Proceedings of the Second IEEE International Symposium on Service-Oriented System Engineering (SOSE'06), vol. 00, IEEE Computer Society, Washington, 2006, pp. 205-209.

Y. Kalfoglou, J. Domingue, L. Carr, E. Motta, M. Vargas-Vera and S. Buckingham Shum, "On the integration of technologies for capturing and navigating knowledge with ontologydriven services," Technical report KMI-01-11, Knowledge Media Institute, United Kingdom, 2001.

R. Schmidt, C. Bartsch, "Ontology-based Modelling of Service Processes and Services," in Proceedings of the IADIS International Conference on Applied Computing, 2007, pp. 67-74.

R. Schmidt, C. Bartsch, R. Oberhauser, "Ontology-based representation of compliance requirements for service processes," in Proceedings of the Workshop on Semantic Business Process and Product Lifecycle Management (SBPM 2007) in conjunction with the 3$^{rd}$ European Semantic Web Conference (ESWC 2007), CEUR Workshop Proceedings, vol. 251, 2007, pp. 28-39.

J. Tatemura, Web Service Decomposition: Edge Computing Architecture for Cache-friendly E-commerce Applications, in International Workshop on Data Engineering Issues in E-Commerce (DEEC 2005), IEEE Computer Society, Washington, 2005, pp. 81-87.

L. Shwartz, N. Ayachitula, M. J. Buco, G. Grabarnik, M. Surendra, C. Ward, S. Weinberger, "IT Service Provider's Multi-Customer and Multi-Tenant Environments" in Proceedings of IEEE Joint Conference on E-Commerce Technology (CEC) and Enterprise Computing, E-Commerce and E- Services (IEEE), 2007.

G. Grabamik, H. Ludwig, L. Shwartz, "Management of Service Process QoS in a Service Provider—Service Supplier Environment" in Proceedings of IEEE Joint Conference on E-Commerce Technology (CEC) and Enterprise Computing, E-Commerce and E-Services (EEE), 2007.

* cited by examiner

$S_a$     service being a potential replacement for service $S_d$
$S_d$     service to be decomposed
remainingServices$S_a$     number of potential alternate services $S_a$ after pre-filtering
serviceProcessFeatures$S_d$     number of serviceProcessFeatures of the decomposed service (process) $S_d$
matchedServiceProcessFeatures$S_a$     number of serviceProcessFeatures of service $S_a$ matching to $S_d$
allMatchedAlternateServices$S_{ai}$     composition of services $S_a$ that could replace $S_d$
matchedAlternateServices$S_a$     service $S_a$ that could replace $S_d$

```
begin;
loop (#remainingServicesS_a > 0);
loop (#serviceProcessFeaturesS_d - #matchedServiceProcessFeaturesS_a ≠ 0);
  1. check if serviceProcessFeaturesS_a match with some serviceProcessFeaturesS_d;
     true: return matchedAlternateServiceS_a;
           #serviceProcessFeaturesS_d = (#serviceProcessFeaturesS_d - #matchedServiceProcessFeaturesS_a);
           #remainingServicesS_a - 1;
           go to 1.;
     else: go to 2.;
  2. check if another service process step S_{d+1} is available;
     true: #serviceProcessFeaturesS_d = (#serviceProcessFeaturesS_d + #serviceProcessFeaturesS_{d+1});
           go to 1.;
     else: return allMatchedAlternateServicesS_a;
end;
```

```xml
<owl:Class>
  <owl:intersectionOf rdf:parseType="Collection">
    <owl:Restriction>
      <owl:onProperty rdf:resource="#hasServiceCategory"/>
        <owl:someValuesFrom>
          <owl:Class>
            <owl:unionOf rdf:parseType="Collection">
              <owl:Class rdf:about="#DataBaseServers"/>        } 720
              <owl:Class rdf:about="#ServerDeployment"/>
            </owl:unionOf>
          </owl:Class>
        </owl:someValuesFrom>
    </owl:Restriction>
    <owl:Restriction>
      <owl:onProperty rdf:resource="#hasServiceFeature"/>
        <owl:someValuesFrom>
          <owl:Class>
            <owl:unionOf rdf:parseType="Collection">
              <owl:Class rdf:about="#FeatureConfigurationRequirements"/>
              <owl:Class rdf:about="#FeatureHardwareEnvironment"/>
              <owl:Class rdf:about="#FeatureServerConfiguration"/>   } 710
              <owl:Class rdf:about="#FeatureSoftwareEnvironment"/>
              <owl:Class rdf:about="#FeatureSystemConfiguration"/>
            </owl:unionOf>
          </owl:Class>
        </owl:someValuesFrom>
    </owl:Restriction>
    <owl:Restriction>                                        730
      <owl:onProperty rdf:resource="#hasServiceLevel"/>
      <owl:someValuesFrom rdf:resource="#MediumServiceLevel"/>
    </owl:Restriction>
    <owl:Class rdf:about="#ServiceProvision"/>
  </owl:intersectionOf>
</owl:Class>
```

APPARATUS AND METHODS FOR DECOMPOSING SERVICE PROCESSES AND FOR IDENTIFYING ALTERNATE SERVICE ELEMENTS IN SERVICE PROVIDER ENVIRONMENTS

TECHNICAL FIELD

The invention generally concerns information technology (IT) computer service provision and more specifically concerns methods and apparatus that implement an ontology-based hierarchical service decomposition and identification approach to support IT service providers in managing operational IT service processes.

BACKGROUND

In order to respond to a customer's requirements in terms of function, economics, and quality for increasingly complex services, an IT service provider must have tools to effectively manage a service portfolio used by the IT service provider to service customer systems. In general, a provider's portfolio includes many services provided by a network of service suppliers. Occasionally, there is a need to upgrade or change an IT service portfolio. The ability to decompose an IT service process allows the service provider to identify certain parts of the currently offered service process which might be considered for replacement by other services for quality, efficiency, or cost considerations.

On a technical level the composition of Web Services for the purpose of building more complex services has become an active area of exploration. Several commonly accepted approaches and methods have been implemented in a wide number of software tools. The paradigm of composing and arranging atomic web services into complex services is generally a bottom-up approach. From a provider's perspective, bottom-up composition of atomic services into complex services is important, particularly when composing new services based on service processes.

Equally important is the ability to replace existing services or constituent elements of services with comparable services. However, problems have been encountered when seeking to replace one service or service element with another service or service element. In practice, the functions of existing service processes and their associated process steps are typically not well-defined. As a result, the replacement of even a single process step is difficult because the service provider does not know if the replacement process has comparable capability.

Figure 1:
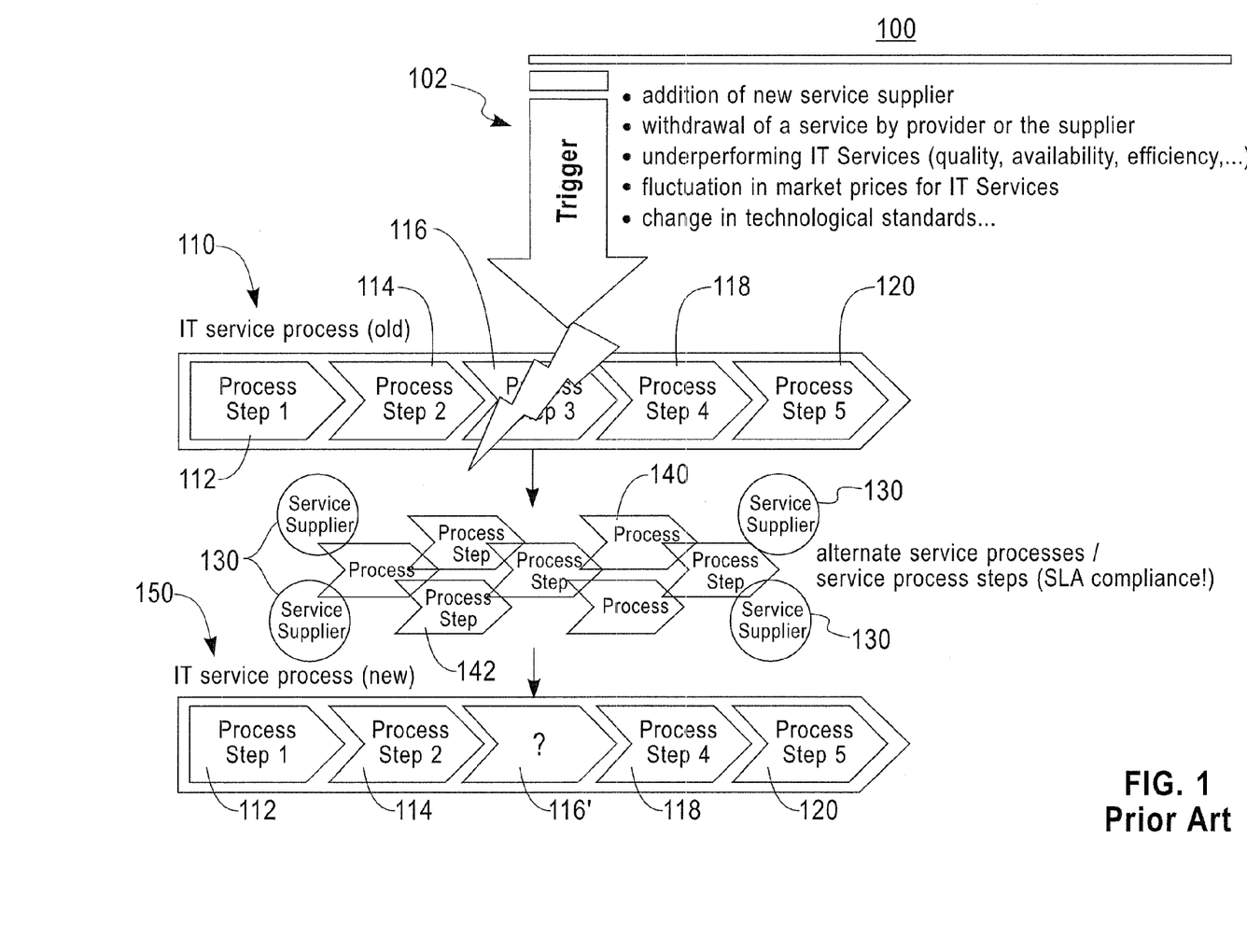
FIG. 1 is a block diagram depicting a problem encountered in the prior art associated with the updating of a service process.

A typical situation 100 encountered in the prior art is depicted in FIG. 1. A service provider is providing an IT service process 110 comprised of process step 1, 112; process step 2, 114; process step 3, 116; process step 4, 118; and process step 5, 120. A trigger event 102 occurs and it becomes necessary to update process step 3, 116. Typical triggering events are addition of a new service supplier; withdrawal of a service by a provider or supplier; under performing IT services (quality, availability, efficiency, etc.); fluctuation in market prices for IT services; and change in technological standards. Although possible service suppliers 130; service processes 140 and service process steps 142 to be used in replacing process step 116 are known to the service provider, the prior art is beset by limitations in deciding how to select among them when creating the new IT service process 150 with new process step 116'.

Another typical situation occurs when it is unclear if a service originally composed according to specific criteria, for example "best service level-to-cost criteria", after a period of time remains adequately efficient taking into account services or suppliers which were added later. Recomposing the whole service is a destructive process. It could mean reestablishment of conventions and renegotiation of service levels, while decomposition of a service that is deemed to be efficient could affect smaller areas of a service-provider business. This is even more problematic in a multi-customer environment where a single process step can be used by several different customers' service processes.

This lack of information may result in an expensive process-reengineering effort to the disadvantage of the customer as well as to the provider. The efficient and flexible management of IT service processes correlates with the service provider's ability to conform to service supplier management standard processes. Nevertheless, a service provider needs to have the ability to adjust its processes and even single process steps based on external as well as internal triggers. Examples of practical triggers are a continuously under performing IT service process (quality, availability, efficiency, etc.), the addition of new service suppliers, the withdrawal of a service by provider or the supplier, a fluctuation in market prices for services, a change in technological standards, or the intention to improve service level capacity and cost as part of its continues improvement strategy.

Somewhat similar problems have been encountered in other fields of endeavor. The structured representation of domain knowledge has become common on the world-wide web as the taxonomy categorization of websites such as Yahoo.com, Amazon.com, and many others have proven. Disciplines such as, for example, medicine, have already modeled large structured and standardized ontologies to share and annotate information in their field. Domain ontologies are primarily developed to enable the reuse of domain knowledge, make domain assumptions explicit, or analyze domain knowledge. According to one definition, an ontology is an explicit specification of a conceptualization which is to be considered an abstract, simplified view of a world that is sought to be represented for some purpose. However, the domain of IT service management and service processes have barely considered ontologies for representing and structuring its vocabulary in a structured manner so far.

In summary, providers of IT services are under constant pressure to reduce cost and improve the quality of the services they provide. Accordingly, those skilled in the art seek methods and apparatus that can decompose IT services (which may be supplied either by a lone IT service provider or by a group of service providers) into elemental service processes and identify alternative service processes of potentially lower cost and/or improved quality which can be substituted into an existing IT service process to create a new IT service process having improved efficiency and lower cost.

SUMMARY OF THE INVENTION

A first embodiment of the invention is a system comprising: a memory storing at least one computer program; and processing apparatus configured to execute the at least one computer program, wherein when the at least one computer program is executed the system is configured to decompose a service process into service process operations; to filter the service process operations based on at least one pre-determined criterion; and to identify at least one different service process operation to be used to replace an existing service process operation.

A second embodiment of the invention is a computer program product comprising a computer readable memory medium storing a computer program, the computer program configured to be executed by processing apparatus, wherein when the computer program is executed operations are performed, the operations comprising: decomposing a service process into service process operations; filtering the service operations based on at least one pre-determined criterion; and identifying at least one different service operations to be used to replace an existing service process operation.

A third embodiment of the invention is a method comprising: decomposing a service process into service process operations; filtering the service process operations based on at least one pre-determined criterion; and identifying at least one different service operation to be used to replace an existing service process operation.

In conclusion, the foregoing summary of the various embodiments of the present invention is exemplary and non-limiting. For example, one or ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Invention, when read in conjunction with the attached Drawing Figures, wherein:

FIG. 7 is an OWL-representation of the "service deployment process" depicted in FIG. 6;

DETAILED DESCRIPTION OF THE INVENTION

In one embodiment of the invention, a three layer process model hierarchy using structured knowledge about the respective service process domain is used to prepare a service process for decomposition into elemental service process steps ("steps" and "operations" are used interchangeably in this disclosure) and the subsequent identification of alternative services.

Figure 2:
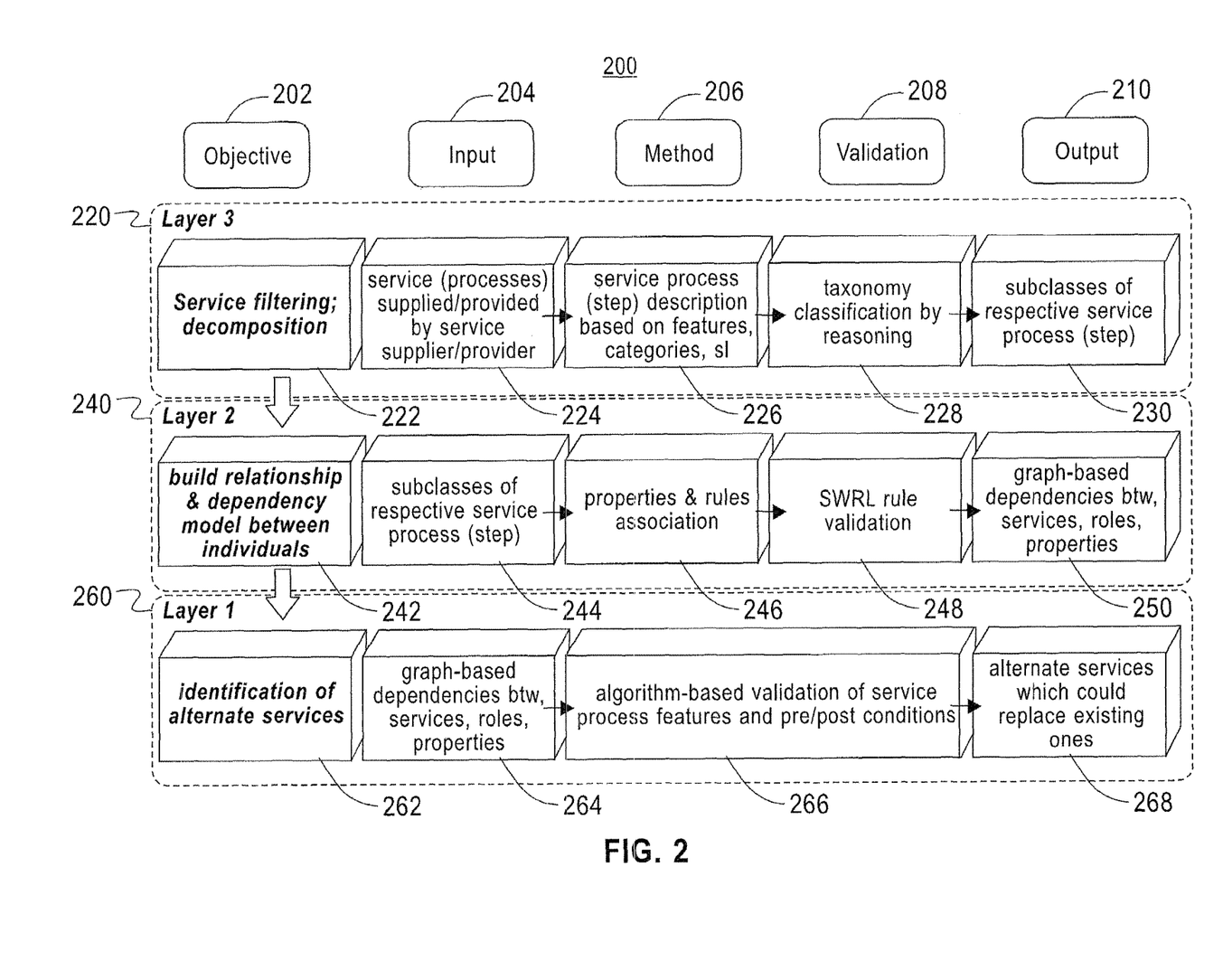
FIG. 2 is a block diagram depicting a method operating in accordance with the invention.

The three layer process model 200 is depicted in FIG. 2. The model is a top-down approach with layer 3, 220 being the most general. A layer itself consists of an objective 202, a workflow composed of an input 204, a method 206 which operates on the input 204, a tool-based validation 208 for each method which produces an output 210 which is compliant with the stated objective 202 of the layer. The output 210 of a layer serves as input for the next layer.

The implementation of the model 200 and the proposed hierarchy model follows the collaborative use of ontology-related tools, applications, and modeling languages. The open-source modeling tool Protege (see http://protege.stanford.edu/) is used to develop example ontology for a decomposable service process and a number of services considered as potential alternatives. This includes the creation of an asserted hierarchy of classes, the modeling of individual services, and the addition of properties and relations.

In this disclosure, the terms 'concept' and 'class' as well as 'individual' and 'instance' have similar meanings and are used interchangeably. The integration of further rules utilizing the Semantic Web Rule Language (SWRL) (see http://www.w3.org/Submission/SWRL) for instance allows a more sophisticated modeling of dependencies between individuals. SWRL is based on a combination of the OWL DL and OWL Lite sublanguages of the OWL Web Ontology Language (see http://www.w3.org/TR/owl-features/) with the Unary/Binary Datalog RuleML sublanguages of the Rule Markup Language. Reasoning tools such as RacerPro (see http://www.racer-systems.com/products/), Pellet or FaCT++ allow the creation of inferred class hierarchies in order to reveal additional relationships and coherences between asserted classes. On the individual level, rule engines such as Jess are used to interpret assigned SWRL rules to allow the building a rule-based dependency model between individuals. The integration of the OWLViz Tab (see, for example, http://www.co-ode.org/downloads/owlviz/) plug-in into the Protégé modeler enables a graphical representation of class dependencies whereas the dependency network between individuals can be created using the Racer Interactive Environment (RICE—see http://www.racer-systems.com/products/) for example. The interaction between all aforementioned artifacts establishes the proposed decomposition and alternative service identification approach explained below in detail. Reference in this regard can be had to F. N. Noy and D. L. McGuinness, "Ontology Development 101: A guide to creating your first ontology," Technical Report KSL-01-05, Knowledge Systems Laboratory, Stanford, 2001; J. Davies, R. Studer and P. Warren, Semantic Web Technologies: Trends and Research in Ontology-based Systems, Wiley, 2006; and D. Gasevic, D. Djuric, V. Devedzic, Model Driven Architecture and Ontology Development, 1st ed., Springer, 2006.

Service pre-filtering and decomposition (layer 3, 220) will now be discussed. As depicted, the objective 222 of layer 3 220 is service filtering and decomposition. The input 224 to this layer corresponds to a service (processes) supplied/provided by a service supplier/provider. The method 226 applied comprises service process (step) description based on features, categories and an SLA. Validation 228 comprises taxonomy classification by reasoning. The output 230 comprises subclasses of respective service process (for example, steps or operations).

The service process decomposition layer 220 aims to represent a provider's service process in a structured and well-defined manner in order to enable the identification of alternative services based on the service description taxonomy. OWL is designed to be used by applications that need to process the content of information instead of just presenting information to humans. This layer uses OWL to describe service processes and other artifacts in terms of concepts allowing the representation of knowledge about:
reference service processes;
service processes which can be decomposed and are available in the provider's service catalog; and
service process features and process roles.

Figure 3:
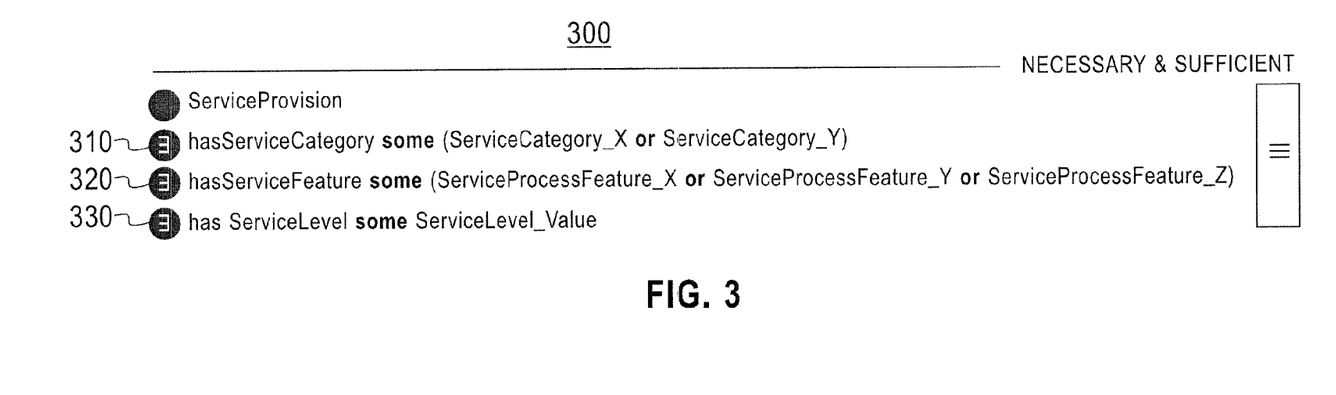
FIG. 3 is a description of a service (process) at the concept level.

The concept-based depiction of services, services processes, and their associated properties mirrors the real ontology. A basic taxonomy 300 characterizes a service (process) under the assumption that it can be assigned to one or more service categories 310, service features 320, and a service level 330 as shown in FIG. 3.

A service process feature is considered to be a unique feature derived directly from the description of a certain step or operation within a reference service process defined by the service provider. Each step or operation is described by one or more features defined by the service provider and/or is referenced to a predefined category directory. It is assumed that a service process feature used to describe other services (processes) points to the same process step or operation within the respective reference service process. If two services are considered as having the same service process feature then it is known that a certain process step or operation in both service processes is similar and at least some functionality is equivalent.

Figure 4:
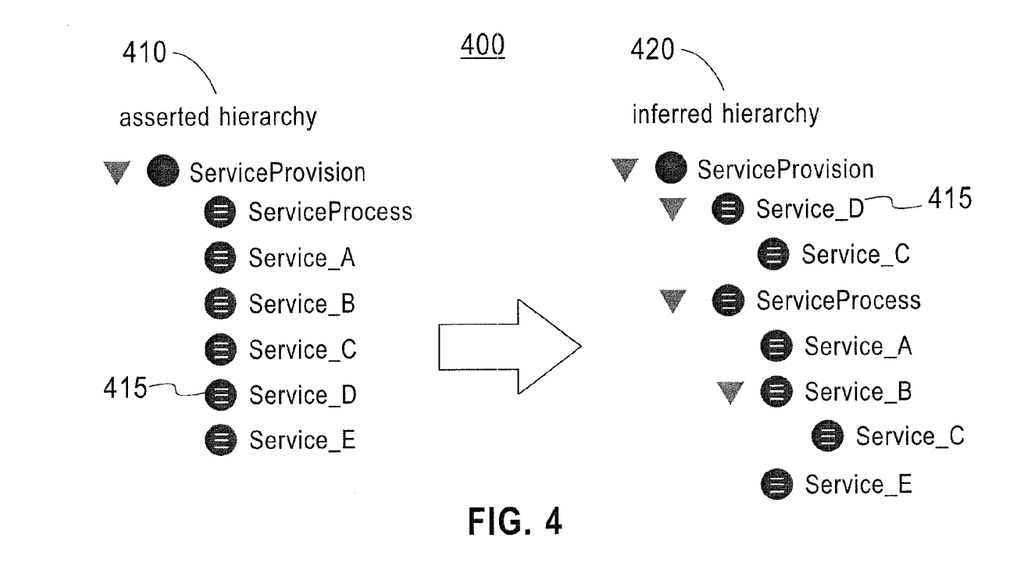
FIG. 4 depicts a decomposition and filtering process in accordance with the invention.

With the intention of making the ontology accessible to automated reasoning the expressiveness of OWL-DL is used. Owl-DL is a sub-language of OWL based on Description Logics (DL) which is a decidable fragment of First Order Logic. It is therefore possible to automatically compute the classification hierarchy and check for inconsistencies in an ontology that conforms to OWL-DL. This characteristic is exploited for the purpose of decomposing a service process and filtering potential alternative services. To do so, each of the modeled services needs to comply with necessary and sufficient conditions in order to facilitate automated reasoning. As a result of the reasoning process 400, an inferred hierarchy 420 of services is obtained from an asserted hierarchy 410. FIG. 4 shows these services being depicted as sub-concepts of the service process to be decomposed.

In this example, a service D 415 is not a sub-concept of the service process and therefore is not mentioned to be a potential candidate for replacing some part of the service process. The reason could be for instance that the assigned service level of service D is lower than the service processes' service level or the assigned service process features and/or categories do not match with the service process ones. On the other hand, all services being a sub-concept of the service process can potentially be used to replace at least some part of the process as they also provide the same or better service level than the respective service process. Hence, the service repository contains hundreds of services like this and another service is added to it. With this approach, it is straightforward to determine if a new service has the potential to replace some part of an already existing service process and where this service could be deployed. In this example for simplicity services are considered which have the same service level or better. In general it is possible to decompose a service into a number of services without restriction on service level of each factored service. Reference in this regard can be had to G. Grabarnik, H. Ludwig, L. Shwartz "Management of Service Process QoS in a Service Provider—Service Supplier Environment" in Proceedings of IEEE Joint Conference on E-Commerce Technology (CEC) and Enterprise Computing, E-Commerce and E-Services (EEE), 2007.

Next to be discussed is layer 2. The objective 242 of Layer 2 is the holistic assembly of the output of Layer 1, that is, dependencies and relationships between services, service processes and respective stakeholders. The input 244 to the method of layer 2, 240 corresponds to the output of layer 3, 220, i.e., subclasses of respective service processes (e.g., steps). The method 246 applied comprises properties and rule association. Validation 248 uses rule validation. The output 250 of layer 2, 240 corresponds to graph-based dependencies.

Continuing, the necessity of creating individuals as an instance from each aforementioned inferred concept hierarchy allows the representation of more concrete knowledge about a service (process). An example is the adding of a service supplier's name or specific requirements on pre- and post-conditions. As the decomposition and pre-filtering approach is based on service categories, service process features, and service levels, reasoning can be simplified on the first level by adding further and more detailed information to a service (process) on the second one. In addition to this, the use of rules notably leverages the design of the dependency network between relevant individuals as a basis for the final identification of concrete alternative services. For our purposes, SWRL is used in order to assign rules to the ontology extending and refining dependencies between respective individual services and service processes. The structure of these rules follows an implication between an antecedent (body) and consequent (head) where both antecedent and consequent are conjunctions of atoms written $a_1 \ldots a_n$. Following the SWRL specification, atoms can be of the form C(x), P(x,y), sameAs(x,y), differentFrom(x,y), or builtIn(r,x, . . . ) where C is an OWL description or data range, P is an OWL property, r is a built-in relation, x and y are either variables, OWL individuals, or OWL data values, as appropriate. Variables are indicated using the standard convention of prefixing them with a question mark as shown in the two following example:

hasProperty1(?x,?y)^hasProperty2(?y,?z)→hasProperty3(?x,?z).

Advantages of using SWRL as a rule language are twofold: From one side it simplifies modeling process by removing some limitations of OWL, and makes the modeling process more natural. From another other side it is a commonly accepted de facto rule language for the OWL. Part of the SWRL is considered as a part of a forthcoming standard for OWL 1.1. One reason why OWL DL has become the most used level of the OWL is that from one perspective it is sufficiently expressive, and from another perspective it has the desirable property of being a decidable language. It is known that extending expressivity of OWL DL is at the expenses of decidability. This characteristic does not affect the proposed usage in this approach because SWRL rules are used to enrich the information value of the dependency network more than for inference issues. Reference in this regard can be had to J. Mei and E. Paslaru Bontas, "Reasoning Paradigms for SWRL-enabled Ontologies," Technical Report TR-B-05-01, Free University of Berlin, 2005. In embodiments of the invention, a subset of the OWL DL called Safe SWRL can be used to insure that processing is still decidable. When the usability is fully developed several approaches like the use of so-called DL-safe rules might be very useful in order to make SWRL rules in combination with OWL DL decidable. Reference in this regard can be had to B. Motik, U. Sattler and R. Studer, "Query Answering for OWL-DL with Rules" in Proceedings of the 3rd International Semantic Web Conference (ISWC 2004), Hiroshima, Japan, 2004, pp. 549-563. This is particularly true when the number of services and associated service processes increases and the creation of more specific and complex rules becomes more and more important in managing relationships and dependencies between respective entities.

Next to be discussed is alternative service identification (layer 1, 260). The objective 262 of layer 1, 260 is the identification of alternate services. The input to the method of layer 1, 260 corresponds to the output 250 of layer 2, 240, i.e., graph-based dependencies between services, roles and properties. Validation 266 is based on algorithm-based validation of service process features and pre/post conditions. The output 268 is an identification of alternate services which can replace existing services.

Figure 5:
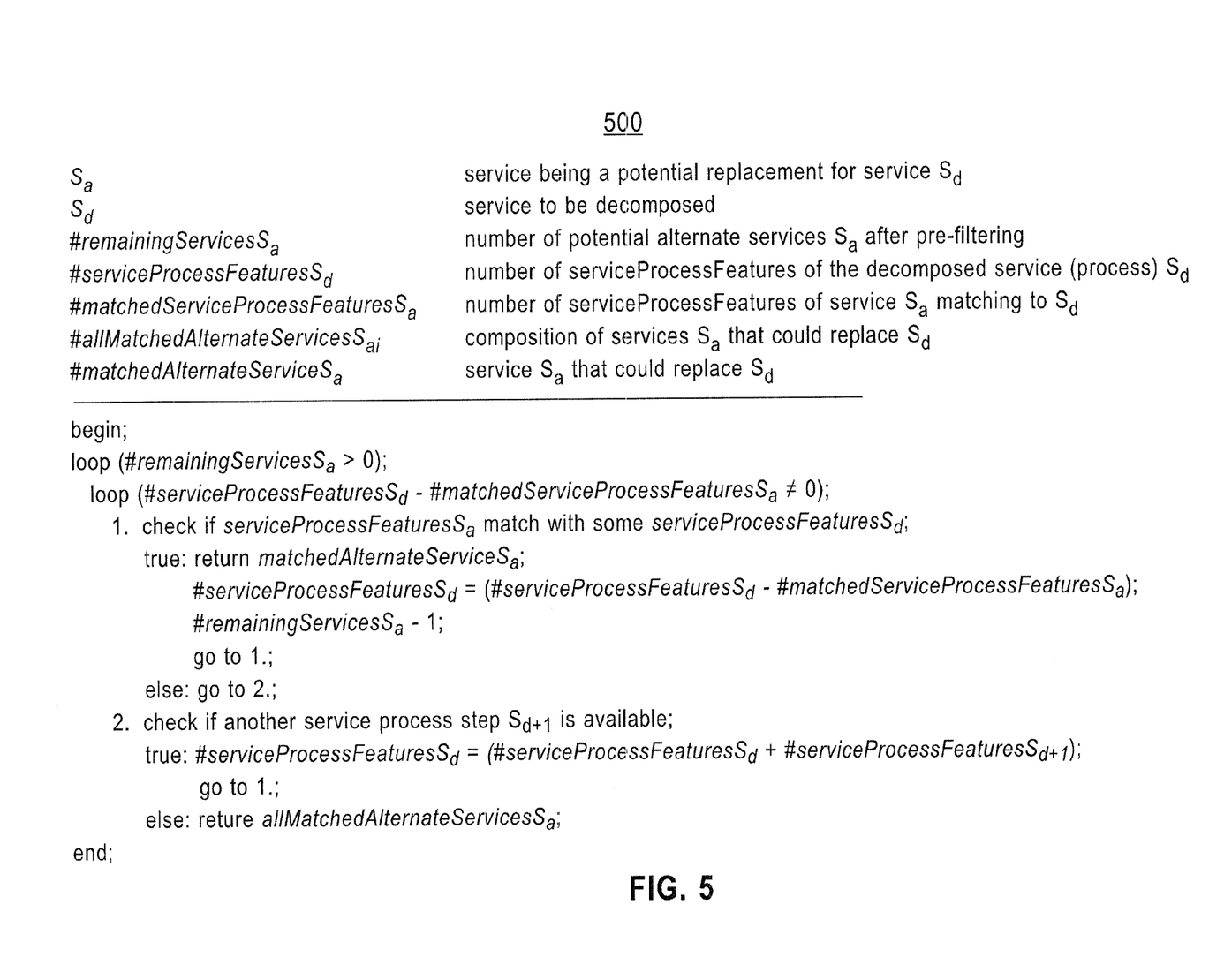
FIG. 5 depicts a service matching algorithm in accordance with the invention.

Once a dependency network between all services and service processes has been created, embodiments of the invention identify if one or more of the remaining services, that is, the filtered output from Layer 3, can be explicitly used to replace a process step based on the respective process features as well as the pre- and post-conditions defined within the reference service process. The following pseudo code-based algorithm 500, shown in FIG. 5, illustrates how a service matching functionality could be realized considering service process features being derived from respective reference service processes.

The result of the algorithm is a list of alternative services or combinations of services which are characterized by the same service process features as the one to be replaced. The composition of services is accomplished by considering pre and post-condition previously defined within the reference process. Because this composition occurs at design time, the provider has the option of deciding if the suggested alternatives will be realized.

Next to be discussed is an example use case of the invention. The following use case, illustrated in FIG. 6, describes how the proposed approach works. An example implementation is discussed afterwards. The scenario assumes that a provider offers a 'server deployment service' through its service catalog to a customer. The service level agreed upon with the customer is medium level. Due to a repeatedly under performance of a service called SetupServEnvironment supplied by service supplier A, the provider decides to look for an alternative service with a comparable or better service level to replace the existing one. To facilitate the use case, it is assumed that all processes are executed sequentially. Additionally it is assumed that a service provider is able to allocate sufficient resources for modeling, creating, assigning, and maintaining service process features as well as all relevant services and service processes.

Figure 6:
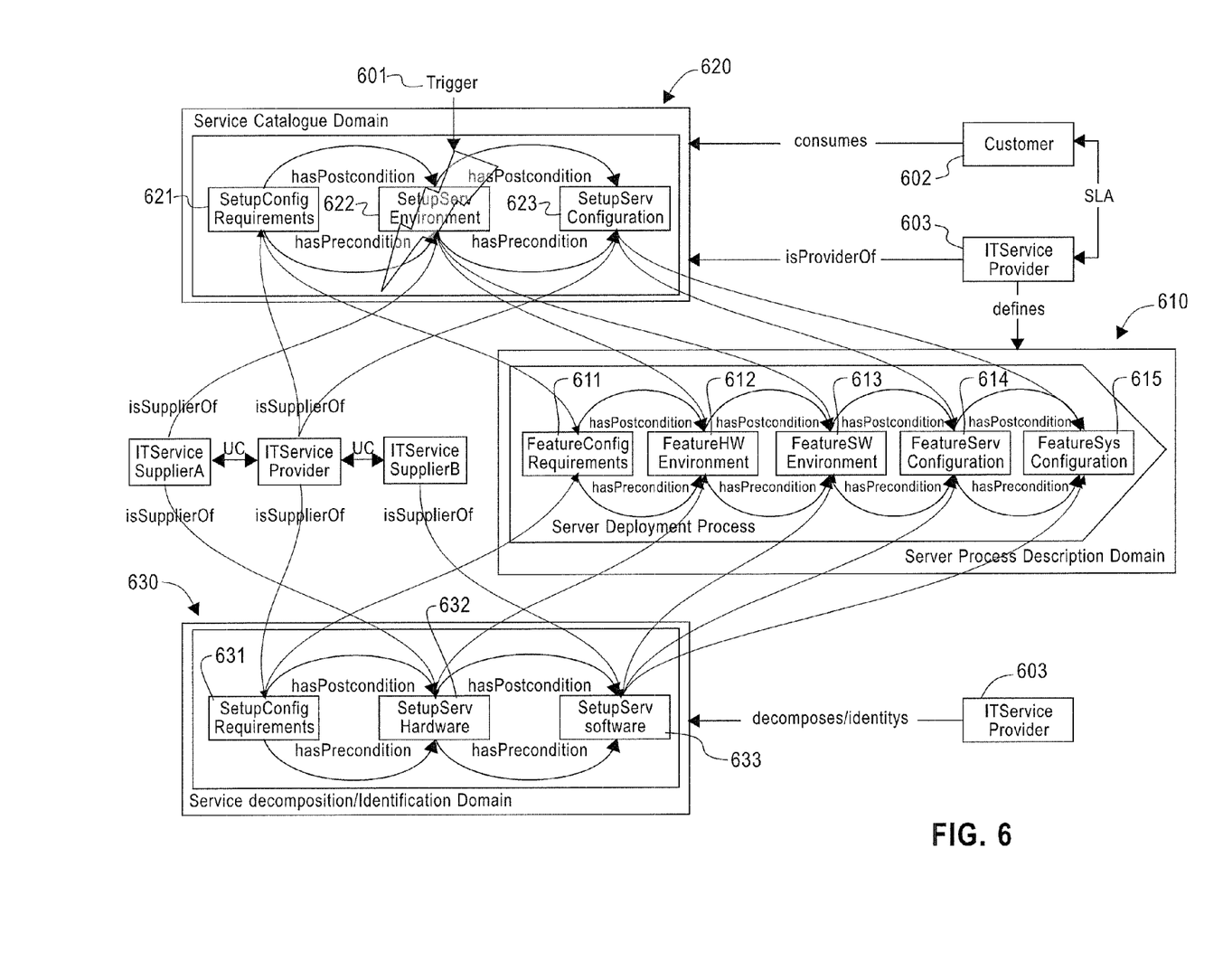
FIG. 6 is a flowchart depicting aspects of the invention in operation.

In the following discussion the use case is differentiated between three domains: a reference service process description domain 610; a service catalog domain 620; and a service decomposition/identification domain 630.

In the reference service process domain 610, a service provider defines reference service processes according to the services already offered to its customers through the service. The reference processes are defined by the function of each of the process steps. The definition (usually a couple of meaningful words) for each process step is considered to be a service process feature which is added to a service process feature repository. Details about the contents of the repository are not discussed at this point.

The service catalog domain 620 represents the service catalog which contains all services and service processes offered to a provider's customer. Each service and the steps of service processes are associated with reference processes by using service process features describing their function.

Within the service decomposition/identification domain 630 the service provider searches for alternative services which can potentially replace existing service process steps in response to internal/external triggers.

The use case can be motivated by
- a service (process) is already available in the provider's service catalog or
- a new service (process) to be added to the service catalog.

In the case of a service process that is already available, it is assumed that the provider provides the process to a customer through the service catalog (Service Catalog Domain 620). In this use case, the service process consists of three sequential services SetupConfigRequirements 621, SetupServEnvironment 622, and SetupServConfiguration 623. Each of these process steps fulfills certain functions. If the respective reference service process, which is the basis for the service process to be offered, has not yet been defined, the service provider must do so. The detailed modeling and description of the reference process creates the service process features which can be used to tag and describe the service process within the service catalog domain. In the present example, the reference service process for deploying a server consists of five consecutively executable process steps:

1. FeatureConfigRequirement, 611
2. FeatureHWEnvironment, 612
3. FeatureSWEnvironment, 613
4. FeatureServConfiguration 614
5. FeatureSysConfiguration, 615.

Once defined by the reference process, the reference process is associated with the offered service under consideration, thus establishing a connection between the two domains.

When an external trigger 601 affects the service SetupServEnvironment 622 and this service needs to be replaced or fixed due to the risk of violating existing service level agreements with the customer 602, the proposed approach can be use to identify services which are described by at least some of the same service process features as the service to be replaced. As a result the service provider receives a suggestion of candidate services for replacing all or part of the service SetupServEnvironment 622.

In this example, the reasoning on all services reveals that service SetupServHardware 632, service SetupServSoftware 633 and some other services use some of the same service process features as does service SetupServEnvironment 622. The usefulness of this approach increases dramatically as the number of services, service processes, and reference processes increase. It allows the service provider to easily identify if certain services have similar or even the same functionality with the effect that they can potentially be exchanged with each other. The last step in this example is the selection of services which match most closely to pre- and post conditions defined by the reference service process as well as to the service process features used to characterize the service SetupServEnvironment 622. In this case, service SetupServEnvironment 622 is defined using features FeatureHWEnvironment 612 and FeatureSWEnvironment 613 implying that the best matching service should also be defined by the same features. Results after filtering indicate that no such service is available. However, a service SetupServHardware 632 is described through the single feature FeatureHWEnvironment 612 and another service SetupServSoftware 633 is described by a sequence of features FeatureSWEnvironment 613, FeatureServConfiguration 614, and FeatureSysConfiguration 615. The combination of theses two services might not only replace the former service SetupServEnvironment 622 but additionally also service SetupServConfiguration 623. As this approach aims to be used at design/composition time, this output is a suggestion to the service provider 603 who makes the final decision of whether or not a service or several services of an existing service process should be replaced by alternatives. In any case, the approach can support the service provider in managing existing service processes more efficiently if detailed knowledge is modeled about a service process' functionality as well as the existing relationship and dependencies to other services and processes.

Useful service process features will now be discussed.

Before decomposing a service process into its respective process steps, the provider needs to model and define the corresponding reference service process including all process steps. For this example a server deployment service is considered which consists of five process steps being represented in OWL-DL 700 as shown in FIG. 7. As a consequence the service process is characterized using five service process features 710, two service categories 720, and a minimum service level 730 the service provider can guarantee to the customer. The granularity of the process description is left to the discretion of the service provider. However, it is useful to choose a level of detail supported by best practice frameworks in order to assure a standardized process description and characterization.

Once defined, the process features can be used for characterizing the functionality of other services available to the service provider. It is assumed that these five features in our example are sufficient to describe the alternative services. The service process—available within the Service Catalog Domain—may contain less granular process steps as some process steps may be supplied by service suppliers as a package of process steps. The provider has to identify what the features of respective packages are and how existing service process features can be utilized to describe these packages. The SetupServEnvironment service 622, for instance, fulfills a functionality which could be described by the existing features FeatureHWEnvironment 612 and FeatureSWEnvironment 613. In practice, there are many more process features, also derived from other references processes, to be used to describe services. In this case, we described six services using aforementioned features, categories and service levels. Reasoning on these services reveals that five of them are mentioned for a potential candidate for replacing at least some part of the service process available in the service catalog due to their descriptions. The service not mentioned as a potential alternative has been filtered because of failing to meet service level criteria.

Next to be discussed is the assigning of properties and roles in order to build a dependency model between process individuals. The pre-filtered services are used in order to determine the relationships and dependencies between the remaining services and:
    the respective reference service processes including pre- and post-conditions,
    the service process in the service catalog,
    their suppliers, and
    their associated service levels.

Figure 8:
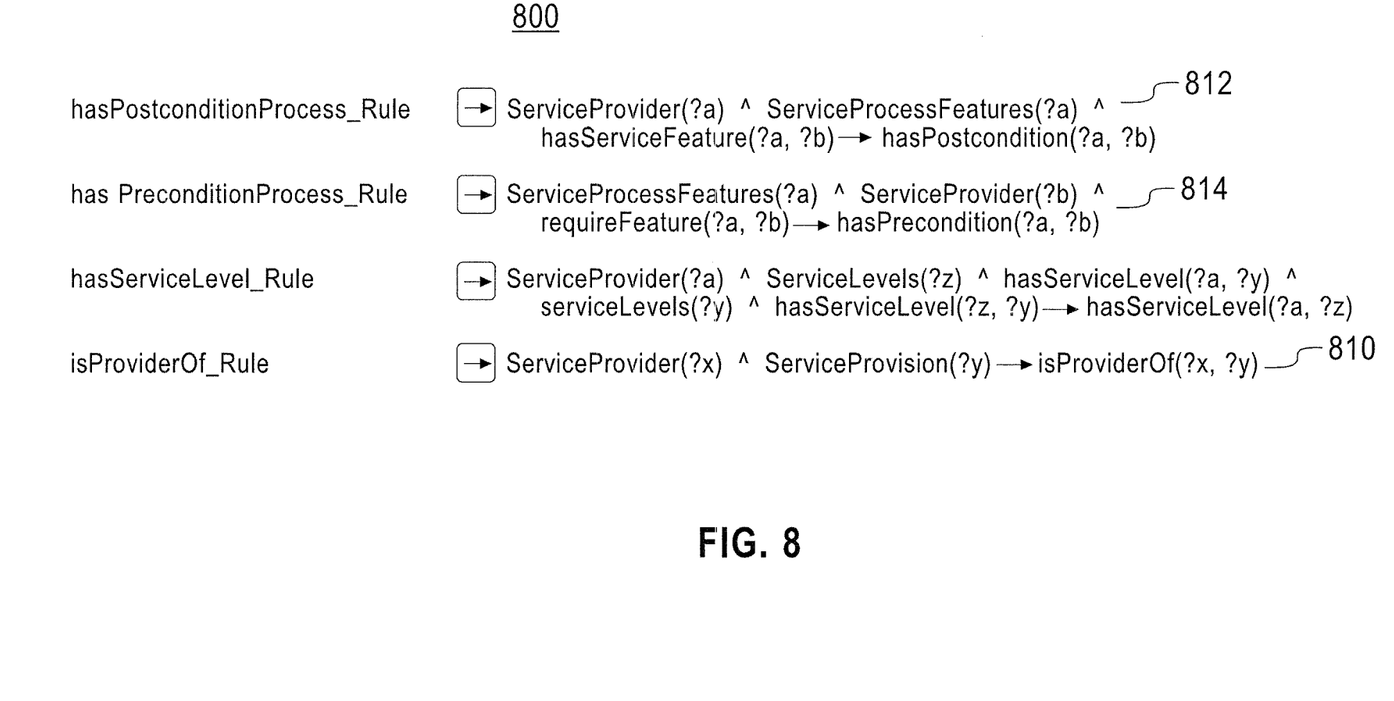
FIG. 8 depicts an example lightweight rule-set expressed in SWRL in accordance with the invention.

The creation of individuals builds the basis for the designated dependency network as it allows both concrete representation of dependencies and the option to assign rules to them in order to enrich the dependency network with additional information. The necessity of assigning rules to the model becomes obvious when examining their impact on representing dependencies among individuals. In this case, lighweight rules 800 are used as shown in FIG. 8 to assign certain relationships to the model, for example: 'A service process is provided by a service provider' 810 or, in order to concatenate service process features 'Service process steps following each other have a pre- and post-condition dependency' 812, 814.

Figure 9A:
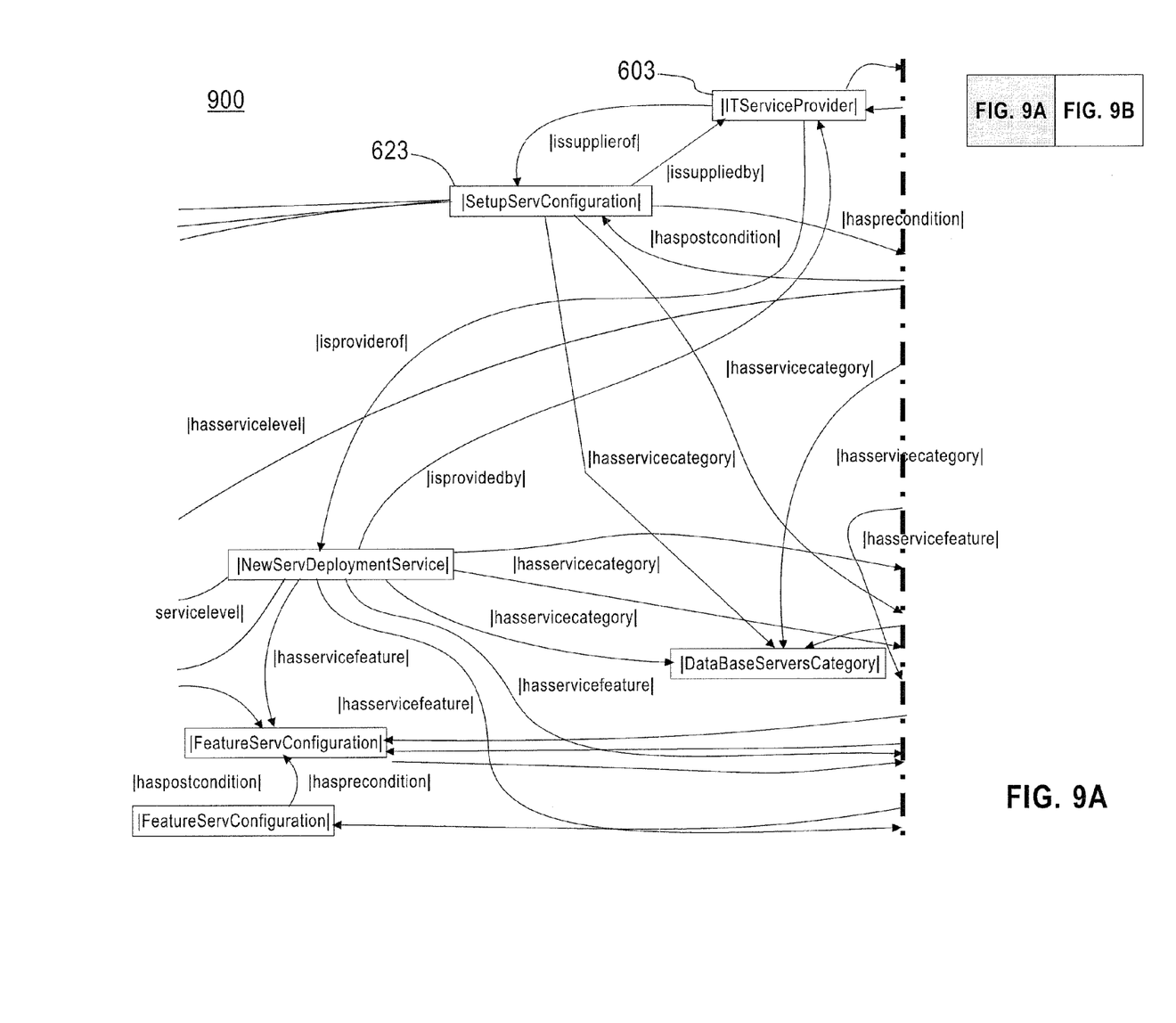
FIG. 9 depicts an extract of a server deployment service dependency network in accordance with the invention.
Figure 9B:
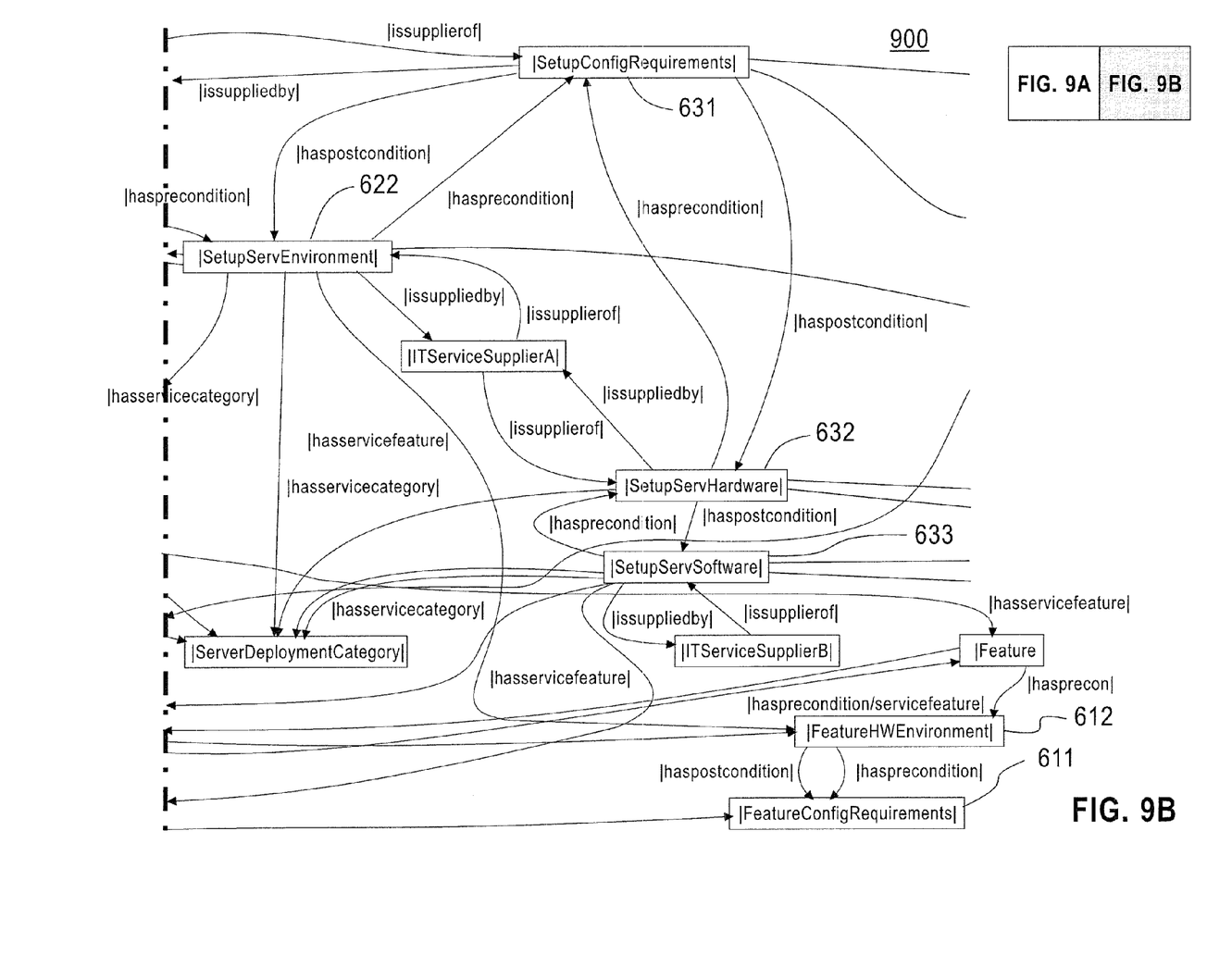

The role of rules becomes increasingly important when the number of services increases because the usage of rules allows the explicit definition of dependencies as well as the option to imply dependencies between services which were not necessary for this concrete example. The outcome of aforementioned procedure is illustrated as a graph-based dependency network 900 using the visualization functionality of RICE as shown in FIG. 9.

All relationships and dependencies are stored within an OWL file. The optional implied knowledge derived from rules can also be added to the same file using the 'SWRL to OWL' functionality of the Jess rule engine.

Based on the existing representation of potential alternative services, the proposed algorithm is supposed to support the service provider in identifying concrete services and even combinations of services as potental replacements for the under performing SetupServEnvironment service 622 within the server deployment service process (Service Decomposition/Identification Domain). It is assumed that all process steps and services appearing before the affected one will remain the same without any changes. As is known, the SetupServEnvironment service 622 is described by the existing features FeatureHWEnvironment 612 and FeatureSWEnvironment 613 which reasons that a service should be identified providing exactly the same service description. Comparing both features to their original source, which is the reference process, it can be seen that FeatureHWEnvironment 612 has to be executed before FeatureSWEnvironment 613 presenting the pre- and post-condition dependency.

Starting with the first feature the algorithm identifies a service SetupServHardware 622 being described by the single feature FeatureHWEnvironment 612. The next service to be looked up should at least contain the feature FeatureSWEnvironment 613 in order to provide a complete matching to the SetupServEnvironment service 622 to be replaced. In the present use case, there is only one such service available called SetupServSoftware which is described by the FeatureSWEnvironment 613 feature but also by the features FeatureServConfiguration 614 as well as FeatureSysConfiguration 615. Either the result is, that no services are available to replace the respective one or we can go back into the server deployment service process and look up what process steps follows after the SetupServEnvironment service 622 and how they are described by service process features. The following service SetupServConfiguration 623 is described by the service process features FeatureServConfiguration 614 and FeatureSysConfiguration 615. Both of these features match to the two remaining ones of the SetupServSoftware service 633. As a result the algorithm identifies a combination of two alternative services which could, based on their service process features, be replacements for the last two process steps of the server deployment service process in the service catalog. In the example a new service supplier B would become part of the service delivery process providing a higher service level then the former one.

In summary, in the invention a structured description of services and service processes is implemented by assigning characteristics such as service process features derived from respective reference service processes, categories, and service levels. An ontology-based approach supports the service provider assigning additional descriptive information to existing service processes in order to identify potential alternative services to replace under performing process steps within an existing service process. The special benefit of this approach becomes obvious when considering a service catalog as well as a service repository containing hundreds of services and service processes. Adding a new service into this existing service environment takes high effort in identifying potential relations and possible dependencies to existing services. This approach allows the identification and filtering of all existing services having at least some of the same applied service process features as the service to be added. As a result, the service provider receives a list of services which could potentially be replaced by the newly added one as this service is described by one or more of the same functions taking the same or higher service levels into account. In embodiments of the invention there it is necessary to take best practices for IT service management, such as ITIL, into account when modeling reference service processes as well as characterizing services. As a result, the proposed approach can facilitate the management and maintenance of provided service processes and improve the ability to react flexibly to external and internal impacts.

The invention will save time and money, by making it possible to identify alternative services for certain service process steps being shared concurrently. In the case of a shared service process step needs to be replaced not only one service process is affected but several ones which might cause severe service level violations for many service providers. Each provider must examine its own offered service processes in order to replace the affected one(s). In most of the cases, this will be done sequentially and result in selection of the first rather than the best fit for replacement. The decomposition approach can support service providers in this situation selecting alternative services being used as shared service process resources again.

Thus it is seen that the foregoing description has provided by way of exemplary and non-limiting examples a full and informative description of the best apparatus and methods presently contemplated by the inventors for decomposing service processes and for identifying alternate service elements in service provider environments. One skilled in the art will appreciate that the various embodiments described herein can be practiced individually; in combination with one or more other embodiments described herein; or in combination with methods and apparatus differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A system comprising:
a memory storing at least one computer program; and
processing apparatus configured to execute the at least one computer program, wherein when the at least one computer program is executed the system is configured:
to recognize a triggering event comprising detection of underperformance of an information technology system indicating a need to update at least one information technology process step of a service process, wherein the underperformance comprises one or more of quality and efficiency of performance;
to decompose a service process associated with a service provider into service process operations defined by one or more service process steps associated with the service provider, wherein the service process is directed to maintaining quality of operation of a computing system and wherein each of the one or more service process operations is directed to performing a function of the computing system, wherein each service process step is associated with a reference service process defined by the service provider, and wherein a reference service process comprises a set of steps or operations defined by the service provider, wherein each step or operation is described by one or more service features defined by the service provider and/or is a reference to a pre-defined category directory, wherein a service process feature is a unique feature derived directly from the description of a step or operation within a reference service process, wherein a service process feature used to describe other services points to the same process step or operation within the respective reference service process and wherein a reference service process also defines pre- and post-conditions associated with the reference service process, wherein each of the service process operations is associated with a set of standardized attributes associated with the service process operation, wherein a service process feature describes a functionality of the service process, and wherein association of two different service process operations with the same service process feature indicates functional equivalency between the two different service process operations;
to filter the service process operations based on at least one pre-determined criterion related to the suitability of the service process operations for replacing an existing service process operation, wherein the at least one pre-determined criterion comprises one or more of quality and efficiency of performance sufficient to remedy the detected underperformance of the information technology system;
to examine a repository of service processes and service process operations associated with the service provider to identify at least one replacement service process operation eligible to be used to replace an existing service process operation, wherein eligibility to be used to replace the existing service process operation comprises one or more of quality and efficiency of performance, and functional equivalency to the existing service process, wherein identifying the at least one replacement service process operation comprises examining at least one description of a standardized attribute of the at least one service process operation to determine suitability for replacement, and wherein examining the at least one description comprises examining a description of at least one service process feature of the replacement service process and the existing service process to determine if the service process feature of the replacement service process and the existing service process point to the same process step within the respective reference service process so as to indicate that the existing service process operation exhibits sufficient functional equivalency to the replacement service process operation to allow for functional equivalency of operation in the service process, wherein determining suitability for replacement takes into account the pre- and post-conditions associated with the service operation and the compatibility of the pre- and post-conditions of the service operation with those of the service operation to be replaced; and to replace the existing service process operation with the replacement service process operation.

2. The system of claim 1 wherein when the at least one computer program is executed the system is further configured to decompose the service process into service process operations using at least one service process feature derived from a reference service process.

3. The system of claim 2 wherein the reference service process defines at least one of a pre- and a post-condition associated with the reference service process.

4. The system of claim 1 wherein when the at least one computer program is executed the system is further configured to generate a graph-based model of the service process indicating at least one of dependencies between service process operations, roles and properties.

5. The system of claim 2 wherein to identify at least one different service process operation to be used to replace an existing service process operation further comprises:
to use the service process feature of the reference service process to identify a service process feature associated with the existing service process operation to be replaced; and
to identify candidate service process operations to be considered as replacements for the existing service process operation using the reference service process feature to identify candidate service process operations that share the service process feature.

6. The system of claim 3 wherein to identify at least one different service process operation to be used to replace an existing service process operation further comprises:
to use at least one of the pre- and post conditions associated with the reference service process to identify at least one of a pre- and post-condition associated with the existing service process operation to be replaced; and
to identify candidate service process operations to be considered as replacements for the existing service process operation using at least one of the pre- and post-conditions associated with the reference service process.

7. The system of claim 4 wherein to identify at least one different service process operation to be used to replace an existing service process operation further comprises:
to use at least one of the dependencies between service process operations, roles and properties indicated in the graph-based model of the service process to identify candidate service process operations to be considered as replacements for the existing service process operation.

8. The system of claim 1 wherein when the at least one computer program is executed the system is further configured to replace the existing service process operation with the at least one different service process operation.

9. The system of claim 1 wherein the existing service process operation further comprises a plurality of service process operations which together constitute a service.

10. The system of claim 1 wherein the at least one pre-determined criterion comprises a service level.

11. The system of claim 1 wherein the at least one pre-determined criterion comprises a service category.

12. The system of claim 1 wherein the at least one pre-determined criterion comprises a service process feature.

13. The system of claim 12 wherein the service process feature describes core functionality of the service process.

14. The system of claim 1 wherein when the at least one computer program is executed the system is further configured to create a model of the service process.

15. The system of claim 1 wherein when the at least one computer program is executed the system is further configured to identify at a least a part of the service process that should be changed.

16. The system of claim 15 wherein a predetermined criterion is used to identify the part of the service process that should be changed.

17. The system of claim 16 wherein the predetermined criterion concerns failure of the service process to meet an agreed-to service level.

18. The system of claim 16 wherein the predetermined criterion concerns availability of new service process operations to replace existing service process operations comprising the service process.

19. A computer program product comprising a non-transitory computer readable memory medium storing a computer program, the computer program configured to be executed by processing apparatus, wherein when the computer program is executed operations are performed, the operations comprising:
recognize a triggering event comprising detection of underperformance of an information technology system indicating a need to update at least one information technology process step of a service process, wherein the underperformance comprises one or more of quality and efficiency of performance;
decomposing a service process associated with a service provider into service process operations defined by one or more service process steps associated with the service provider, wherein the service process is directed to maintaining quality of operation of a computing system and wherein each of the one or more service process operations is directed to performing a function of the computing system, wherein each service process step is associated with a reference service process defined by the service provider, and wherein a reference service process comprises a set of steps or operations defined by the service provider, wherein each step or operation is described by one or more service features defined by the service provider and/or is a reference to a predefined category directory, wherein a service process feature is a unique feature derived directly from the description of a step or operation within a reference service process, wherein a service process feature used to describe other services points to the same process step or operation within the respective reference service process and wherein a reference service process also defines pre- and post-conditions associated with the reference service process, wherein each of the service process operations is associated with a set of standardized attributes associated with the service process operation, wherein a service process feature describes a functionality of the service process, and wherein association of two different service process operations with the same service process feature indicates functional equivalency between the two different service process operations;
filtering the service operations based on at least one pre-determined criterion related to the suitability of the service process operations for replacing an existing service process operation, wherein the at least one pre-determined criterion comprises one or more of quality and efficiency of performance sufficient to remedy the detected underperformance of the information technology system;

examining a repository of services and service processes associated with the service provider to identify at least one replacement service operation eligible to be used to replace an existing service process operation, wherein eligibility to be used to replace the existing service process operation comprises one or more of quality and efficiency of performance, and functional equivalency to the existing service process, wherein identifying the at least one replacement service process operation comprises examining at least one description of a standardized attribute of the at least one service process operation to determine suitability for replacement, and wherein examining the at least one description comprises examining a description of at least one service process feature of the replacement service process and the existing service process to determine if the service process feature of the replacement service process and the existing service process point to the same process step within the respective reference service process so as to indicate that the existing service process operation exhibits sufficient functional equivalency to the replacement service process operation to allow for functional equivalency of operation in the service process, wherein determining suitability for replacement takes into account the pre- and post-conditions associated with the service operation and the compatibility of the pre- and post-conditions of the service operation with those of the service operation to be replaced; and replacing the existing service process operation with the replacement service process operation.

20. A method comprising:

configuring a processor to analyze data relating to a service process to:
  recognize a triggering event comprising detection of underperformance of an information technology system, indicating a need to update at least one information technology process step of a service process, wherein the underperformance comprises one or more of quality and efficiency of performance;
  decompose a service process associated with a service provider into service process operations defined by one or more service process steps associated with the service provider, wherein the service process is directed to maintaining quality of operation of a computing system and wherein each of the one or more service process operations is directed to performing a function of the computing system, wherein each service process step is associated with a reference service process defined by the service provider, and wherein a reference service process comprises a set of steps or operations defined by the service provider, wherein each step or operation is described by one or more service features defined by the service provider and/or is a reference to a predefined category directory, wherein a service process feature is a unique feature derived directly from the description of a step or operation within a reference service process, wherein a service process feature used to describe other services points to the same process step or operation within the respective reference service process and wherein a reference service process also defines pre- and post-conditions associated with the reference service process, wherein each of the service process operations is associated with a set of standardized attributes associated with the service process operation, wherein a service process feature describes a functionality of the service process, and wherein association of two different service process operations with the same service process feature indicates functional equivalency between the two different service process operations;
  filter the service process operations based on at least one pre-determined criterion related to the suitability of the service process operations for replacing an existing service process operation, wherein the at least one pre-determined criterion comprises one or more of quality and efficiency of performance sufficient to remedy the detected underperformance of the information technology system;
  examine a repository of service processes and service process operations associated with the service provider to identify at least one replacement service process operation eligible to be used to replace an existing service process operation, wherein eligibility to be used to replace the existing service process operation comprises one or more of quality and efficiency of performance, and functional equivalency to the existing service process, wherein identifying the at least one replacement service process operation comprises examining at least one description of a standardized attribute of the at least one service process operation to determine suitability for replacement, and wherein examining the at least one description comprises examining a description of at least one service process feature of the replacement service process and the existing service process to determine if the service process feature of the replacement service process and the existing service process point to the same process step within the respective reference service process so as to indicate that the existing service process operation exhibits sufficient functional equivalency to the replacement service process operation to allow for functional equivalency of operation in the service process, wherein determining suitability for replacement takes into account the pre- and post-conditions associated with the service operation and the compatibility of the pre- and post-conditions of the service operation with those of the service operation to be replaced; and
  replace the existing service process operation with the replacement service process operation.

* * * * *